(12) United States Patent
Eide

(10) Patent No.: US 8,847,758 B2
(45) Date of Patent: Sep. 30, 2014

(54) SENSOR UNIT AND METHOD FOR MONITORING THE STATE OF FASTENERS

(76) Inventor: Tore Eide, Trondheim (NO)

( * ) Notice: Subject to any disclaimer, the term of this patent is extended or adjusted under 35 U.S.C. 154(b) by 349 days.

(21) Appl. No.: 12/921,410

(22) PCT Filed: Mar. 11, 2009

(86) PCT No.: PCT/NO2009/000091
§ 371 (c)(1),
(2), (4) Date: Sep. 8, 2010

(87) PCT Pub. No.: WO2009/113873
PCT Pub. Date: Sep. 17, 2009

(65) Prior Publication Data
US 2011/0006899 A1    Jan. 13, 2011

(30) Foreign Application Priority Data
Mar. 12, 2008   (NO) .................................. 20081306

(51) Int. Cl.
G08B 13/18 (2006.01)
B60Q 1/00 (2006.01)
A47C 1/08 (2006.01)
A47C 31/00 (2006.01)
F16G 3/00 (2006.01)
F16G 7/00 (2006.01)
A44B 21/00 (2006.01)
G01L 5/10 (2006.01)
B60P 7/08 (2006.01)

(52) U.S. Cl.
CPC .............. G01L 5/103 (2013.01); B60P 7/0861 (2013.01); G01L 5/107 (2013.01); G01L 5/101 (2013.01); G01L 5/102 (2013.01)

USPC .................. 340/568.1; 340/457.1; 297/250.1; 297/469; 24/31 R; 24/32; 24/31 V

(58) Field of Classification Search
CPC ..................... B60N 2/2812; B60N 2002/2815; E05B 2045/067; E05B 73/00; E05B 73/0005; E05B 73/0082
USPC ............ 340/568.1, 457.1; 24/31 R, 32, 31 V; 297/250.1, 469
See application file for complete search history.

(56) References Cited

U.S. PATENT DOCUMENTS 4,516,110 A * 5/1985 Overmyer .................. 340/323 R
5,436,420 A * 7/1995 McFarlin et al. ............ 200/82 R
(Continued)

FOREIGN PATENT DOCUMENTS

DE    20214178    2/2003
EP    1467193     10/2004
(Continued)

Primary Examiner — George Bugg
Assistant Examiner — Munear Akki
(74) Attorney, Agent, or Firm — Ladas & Parry LLP

(57) ABSTRACT

Sensor unit (30) for monitoring the state of fasteners, such as ratchet straps, chains, wires, ropes, bars or similar, which are being used for fastening and/or securing and/or anchoring one or more objects (20), which fasteners preferably includes fastening means (14, 104) and means (15, 100) for tensioning of the fasteners. The sensor unit (30) includes one or more measuring elements (32) for measuring tension force and/or tension and/or pressure and/or bending moment and/or shear force for the fastener and/or fastening means (14, 104) of the fastener and/or anchoring devices (22) for fasteners for monitoring the state of the fasteners.

38 Claims, 10 Drawing Sheets

(56) References Cited

U.S. PATENT DOCUMENTS

Figure 1A:
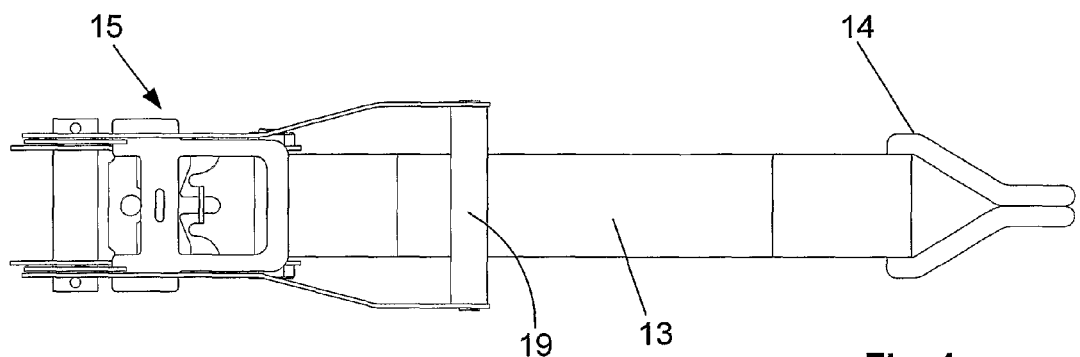

| | | | |
|---|---|---|---|
| 5,698,785 A * | 12/1997 | Rich et al. | 73/514.33 |
| 6,253,627 B1 * | 7/2001 | Lee et al. | 73/862.393 |
| 6,288,506 B1 * | 9/2001 | Hiwatari | 318/283 |
| 6,482,286 B1 * | 11/2002 | Harvey et al. | 156/244.27 |
| 7,112,023 B1 | 9/2006 | Tardif | |
| 7,207,619 B2 * | 4/2007 | Yamamoto | 296/68.1 |
| 7,735,920 B2 * | 6/2010 | Hinze et al. | 297/250.1 |
| 2001/0054311 A1 * | 12/2001 | Hakenesch | 73/170.02 |
| 2005/0172462 A1 * | 8/2005 | Rudduck et al. | 24/606 |
| 2006/0006713 A1 * | 1/2006 | Patterson et al. | 297/250.1 |
| 2006/0012236 A1 * | 1/2006 | Kock et al. | 297/469 |
| 2006/0150744 A1 * | 7/2006 | Mamie | 73/831 |
| 2007/0056146 A1 * | 3/2007 | Madachy et al. | 24/68 CD |
| 2008/0238647 A1 * | 10/2008 | Abe | 340/457.1 |

FOREIGN PATENT DOCUMENTS

| | | |
|---|---|---|
| EP | 1783473 | 5/2007 |
| FR | 2866290 | 8/2005 |

* cited by examiner

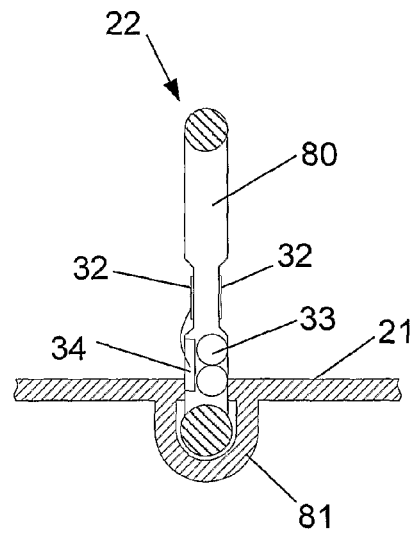
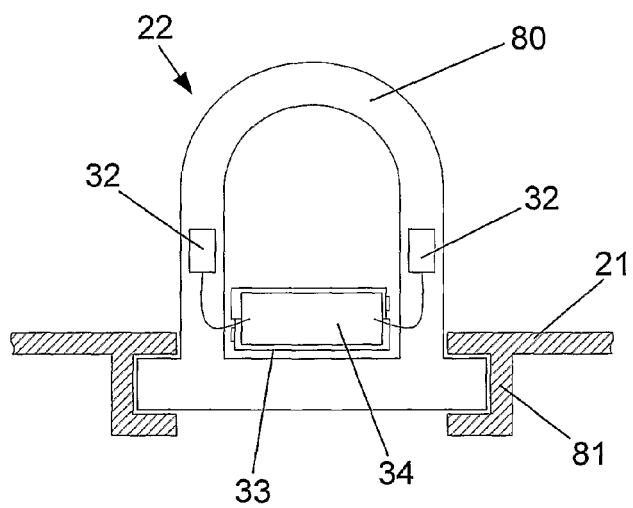
Fig. 12a                    Fig. 12b
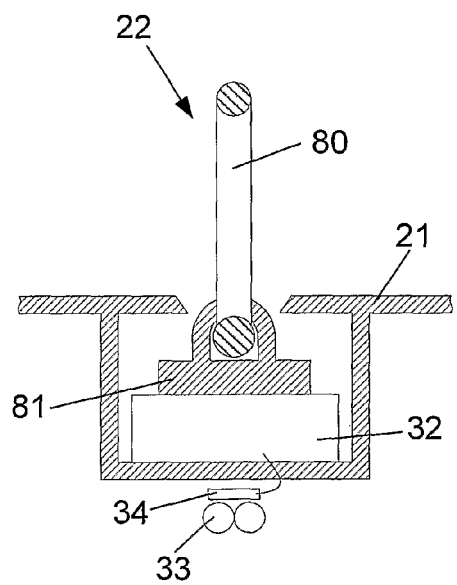
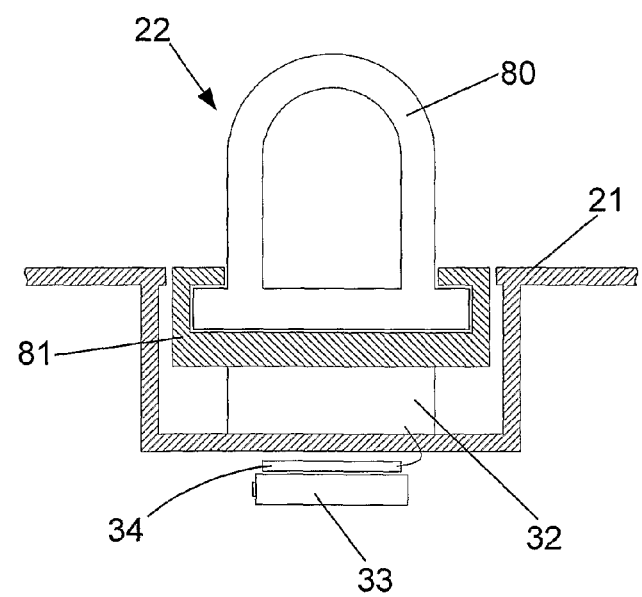
Fig. 12c                    Fig. 12d

SENSOR UNIT AND METHOD FOR MONITORING THE STATE OF FASTENERS The present invention relates to a sensor unit for monitoring the state for fasteners used for fastening and/or securing and/or anchoring one or more objects according to the preamble of claim 1. The invention further relates to a method for monitoring the state of the fasteners according to claim 15.

BACKGROUND

Too often it happens that gods loosen and is displaced, or fall off during transport. Sometimes this results in fatal consequences with loss of lives, while other times there are only material damages and loss of values. Badly secured loads represent, in any case, an undesired risk and should be fought with all means. Good training of the drivers is most important, next frequent controls and powerful response to misconducts. The road traffic act gives the driver a complete and independent responsibility that the vehicle is being properly loaded. Still it often occurs that a load loosens or is being displaced, so that gods fall off or that the vehicle tilts. Load is today, for example, secured by means of fasteners, such as ratchet straps, chains, wires, ropes, and bars or similar. The fasteners are usually of a type which can be tightened after they are adapted around/to an object to be fastened, secured or anchored.

Even if the load is secured by fasteners, as mentioned above, it could during transport be displaced due to movements or that the load has "yielded", so that the fasteners are slacked. It is thus a great need for reliable systems which can provide an early warning of a possible dangerous situation, which thus can be avoided. This is important for preventing accidents with loss of lives and loads at transport, among others, on road, at sea, rails or in the air.

There are known different systems for this object.

From EP 1467193 it is known a system for monitoring the tensile stress in a belt around an object. In EP 1467193 there is used a force sensor to measure the tensile stress.

From U.S. Pat. No. 6,357,978 it is known a load indicator for indicating tensile stress, especially in a ratchet strap. U.S. Pat. No. 6,357,978 describes primarily a visual indicator.

GB 2255109 describes a system for measuring load by means of mechanical metering of the load.

Prior art technique is switch-based, which results in that a continuous monitoring is not possible, but will be an "on" or "off" measurement which can result in that a warning is provided too late in a critical situation. Switch-based solutions further have no plain way to change the setting for the warning of a critical situation, as this must be done mechanically. Known solutions neither exhibit nor suggest measuring principles which are usable for different types for fasteners.

OBJECT

The main object of the present invention is to provide a secure and reliable sensor unit for monitoring fasteners used for fastening and/or securing and/or anchoring one or more objects. It is further an object that the sensor unit should provide opportunities for a warning at an early stage, before a critical situation arises. It is further an object of the present invention to provide a novel measuring principle which results in that it can be used for different types of fasteners, which can be arranged to and/or integrated in different positions in and/or to the fasteners, and/or in relation to fastening devices for fasteners. It is further an object that the sensor unit does not intervene with or deteriorate the original properties of the fasteners. It is also an object that the invention easily can be arranged to new or existing fasteners and that if the fasteners are replaced, the invention can be arranged to the new parts in a simple way. It is further an object that the sensor unit constitutes a small physical unit which can be integrated with the fasteners in a compact and robust manner. It is also an object that the sensor unit should have a long uptime and service life with a minimal need for maintenance and inspection. It is finally an object of the present invention to provide a secure and more reliable system than prior art solutions.

THE INVENTION

A sensor unit according to the invention is described in claim 1. Preferable features and properties of the sensor unit are described in claims 2-13.

A method according to the invention is described in claim 14. Preferable features and properties of the sensor unit are described in claim 15.

With fasteners are meant ratchet straps, chains, wires, ropes, bars or similar, which can be used, for example, to secure objects in connection with transport. Fasteners are usually divided in two parts (not always), in the form of a tensioning device and a longer part which is arranged to and/or around one or more objects to be secured, before the fasteners are tensioned by means of the tensioning device. Fasteners are further preferably provided with fastening means for attachment of the fasteners to an attachment device of a load carrier of a transport means being used for transporting the object, or some other suitable anchoring point.

The sensor unit includes means/measuring elements for measuring the state of fasteners for warning if the state corresponds to a critical solution. Deviations in the state of fasteners can be the first indication of that the object, i.e. a load, is about to displace or that some of the load/object has "yielded", so that the fastener is slacked. Slack in the fastener provides the load with the opportunity of moving, and this can generate great forces on fasteners and fastening means. This can further result in that the fastener is torn off or that the load is deformed, so that the load is being displaced, damaged, damages other loads or falls off the load carrier. By means of the present invention it is possible to provide an early warning of a possible critical solution and a possible avoidance. The present invention can also prevent situations where a loose load results in damage of load and load carrier, and thus reduces the costs for the transporter.

The measuring element preferably exhibits properties to change electrical wire resistance and/or exhibits properties to change capacitance and/or exhibits properties to change inductance and/or exhibits properties to change magnetic field and/or exhibits properties to change optical connection or phase information, with varying tension force and/or tension and/or pressure and/or bending moment and/or shear force; and or exhibits properties for generating electrical potential as a consequence of mechanical affection in one or more axes. Alternatively the measuring element can be a multi-axed force sensor.

The measuring element preferably constitutes a part of a suitable measure setup, such as a measuring bridge (for example a Wheatstone bridge), and the output from this would be an electrical measuring signal which represents the tension and/or pressure and/or bending moment and/or tension force and/or shear force affecting the measuring element, and thus provides information on the forces acting on the fastener and can thus provide information on the state of the fastener.

Preferably the sensor unit further includes an electronics card which includes one or more measuring amplifiers which amplify the signal from the measuring element to a level adapted for digitalization and further processing. The sensor unit further preferably includes a power supply, control unit and communication means for communication with one or more external units for further processing of the measured values, and to provide a warning about a critical situation.

The sensor unit also preferably includes a protective housing enclosing the sensor unit.

The sensor unit can also include an elastic deformable element, arranged to and/or integrated in a suitable part of the fasteners or attachment devices/anchoring points for fasteners of a load carrier. The elastic deformable element is preferably an extended circular sleeve or similar, arranged to an extended circular part of the tensioning device of the fasteners, the fastening means of the fastener, a connection link or attachment devices of a load carrier. This is, for example, fastening bolts for ratchet straps. The elastic element can also have other shapes adapted for arrangement at other suitable positions in connection with the fasteners. It is advantageous that the deformable element is uniform, so that forces acting on the element affect evenly over the entire element. To the elastic deformable element it is arranged one or more measuring elements. If the sensor unit includes an elastic deformable element, this is also encapsulated in the housing of the sensor unit. The housing itself can be a deformable element and the deformable element can also be arranged outside the housing. The measuring element can further, for example, be an integrated part of an electronics card for the sensor unit, by being arranged, for example, to the electronics card as a component and/or designed as a part of the path pattern of the electronics card, so that it captures tension and/or pressure and/or bending moment and/or tension force and/or shear force in the electronics card itself and/or in the protective housing and/or in the cast-in and/or connected to a deformable element.

As forces affect the elastic element resulting in deformation, the measuring element is able to measure this and thus inform about the forces affecting the elastic element. One great advantage of using an asymmetrical deformable elastic element, onto which is arranged one or more measuring elements, is that it can be integrated with existing fastener equipment in a compact way, so that the force can be measured without introducing a new element with the responsibility for the transmission of force. Used on, for example, a load strap/ratchet strap, the sensor unit can be arranged, for example, between the belt and a fastening bolt, so that the belt runs outside the sensor unit.

The measuring principle for measuring tension and/or pressure and/or bending moment and/or tension force and/or shear force in the fasteners or fastening means for the fasteners or attachment devices for fasteners of a load carrier or other suitable anchoring points, is based on arranging/integrating one or more measuring elements to/in:

1. an elastic deformable element arranged to/in a suitable part of the fasteners,
2. a supporting construction of the tensioning device,
3. a supporting construction of a fastening means for the fasteners,
4. a supporting construction of a connection link between the tensioning device and the fasteners or between fasteners and the fastening means of the fasteners,
5. a supporting construction of a detachable unit,
6. a suitable material integrated in the fasteners itself,
7. an electronics card, which is a component and/or designed as a part of the path pattern of the electronics card,
8. an attachment device arranged in a load carrier,
9. a combination of the points 1-8.

By having one or more measuring elements, as described above, arranged to and/or integrated in one or more ways as described above, the electrical signal from the measuring element changes proportionally as the tension force and/or tension and/or pressure and/or bending moment and/or shear force in the fastener increases. After amplifying and filtering/adaption and digitalization, the measuring values are represented as numbers, and can be further processed by the control unit of the electronics card, such as a microcontroller provided with suitable software. Non-linearity in the measurements can be compensated by that the control unit also is provided with software for this, so that a linear connection between the tension force and measured values for the entire measuring range is achieved. If desirable, the measuring signal can further be converted into metric values (Kg) for tension force. The software in the control unit or a message from an external unit can decide how often it should be measured, and to save power the measuring element (i.e. the measuring bridge) can be electrical connected only when performing measurements.

Each sensor unit is further preferably provided with an ID code which makes it recognizable for an external unit which can communicate with the sensor unit, for warning about critical states of the fasteners.

The sensor unit can thus acquire state information (force information) on the fasteners, and send this information to one or more external units which can make an operator, for example a driver of a transport means, observant of a possible critical state by a visual and/or audible and/or other type of warning or alarm.

Critical situations, i.e. warning and/or alarm situations, can among others be states where there are measured a clear tendency of force change over time, and/or sudden changes which exceeds defined threshold values, and/or change patterns in the tension force which indicate insufficient fastening, anchoring or securing, and thus may result in dangerous situations over time. Both increasing and decreasing force changes can be a source of an alarm. To find clear change tendencies, the sensor unit is preferably arranged to filter, i.e. neglect from the evaluation, rapid changes in the tension force which, for example, are due to uneven roadway, turns or bumps, but to take care of and evaluate all changes which reflect an undesired change pattern and/or which exceeds defined threshold values.

By means of the sensor unit, which preferably reports to one or more external units, an operator of a transport means will at any time have full control of the forces acting on the fasteners, and thus an overview of the states of the fasteners.

Warning and/or alarm situations also mean burglary. Burglary from a truck is widespread and results in great losses for transporters and insurance companies. Side walls/curtains are often cut up to gain easy access to the load, and this usually happens at rest areas while the driver sleeps or rests.

The present invention also has a function for warning of burglary and loss from a load carrier. The sensor registers all changes in the tension force, and the system can be set up to provide an alarm if the load is un-tensioned/loosened without this being arranged and logged by the base unit. The driver can thus be warned, and a message can be sent to a warning central or transport company central. The same type of central warning can be sent to reveal loss from disloyal drivers. It can also produce a warning with sound/light to scare away the intruders, and/or start a video recording from a camera arranged in the load carrier.

The system will show when the different securing means have been loosened, and provide opportunities for revealing loss also after the transport. The base unit can store position data (GPS) and thus also inform where the securing was loosened.

The sensor unit according to the invention has the advantage that it in a plain manner can be arranged to existing fasteners or integrated into new fasteners, and that it is applicable to many types of fasteners, such as ratchet straps, chains, ropes, bars, wires and similar.

The sensor unit further has a compact and robust construction resulting in that it can resist impacts and humidity, and that it in many cases can be integrated/hidden in different parts of the fasteners, so that it is not easily exposed to damage.

The sensor unit is preferably arranged to receive information, such as changes of threshold values for critical situations, system parameters, calibration, the change of ID codes and similar.

The sensor unit is preferably arranged to be able to report status for tension force, system parameters, power supply and communication, and possible errors and other relevant information to an external unit. The sensor unit is also preferably arranged to report other measured parameters, such as temperature, humidity, acceleration and more.

The external unit communicating with the sensor unit preferably has means for storing measured values, so that they later can be transferred to additional external system, such as a business control system and/or a fleet control system and/or a report system.

In addition to the above mentioned properties, the invention will result in increased attention to the forces acting on the fasteners and the fastening/securing/anchoring of goods in connection with transport. This will in itself have a preventive effect in that it provides the operator with a tool to provide a better understanding of how the forces affect during the transport, and the knowledge can thus be increased and the fasteners be better adapted to the goods being transported.

EXAMPLE

Figure 1B:
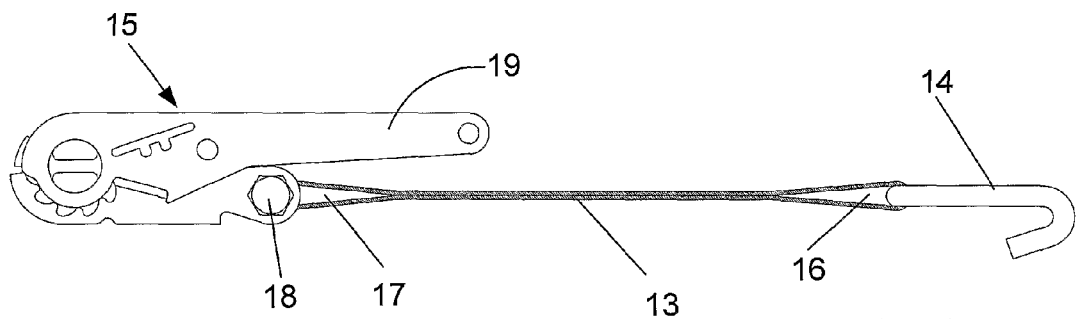
Figure 2:
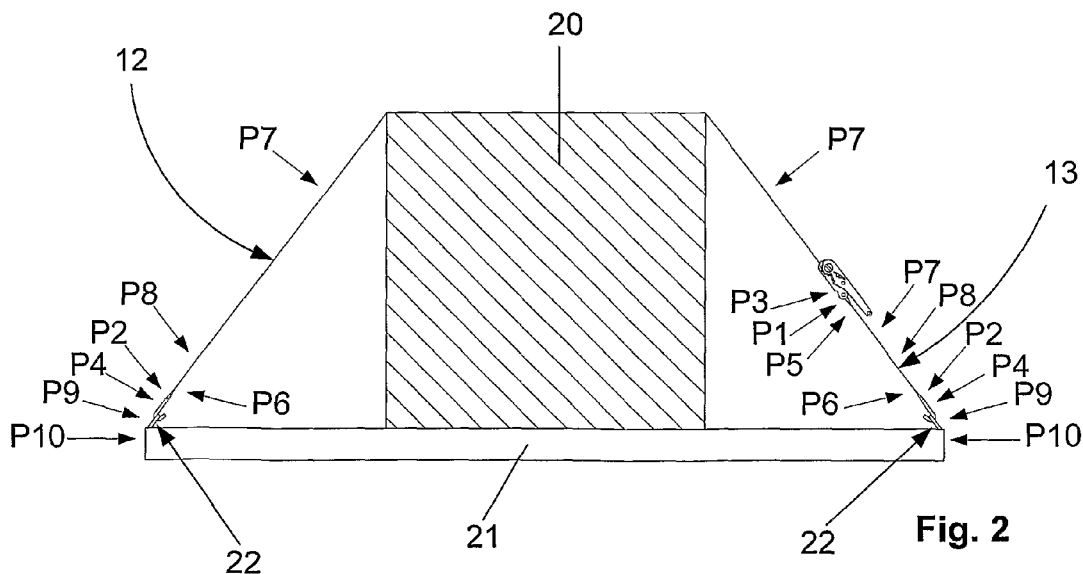
Figure 3A:
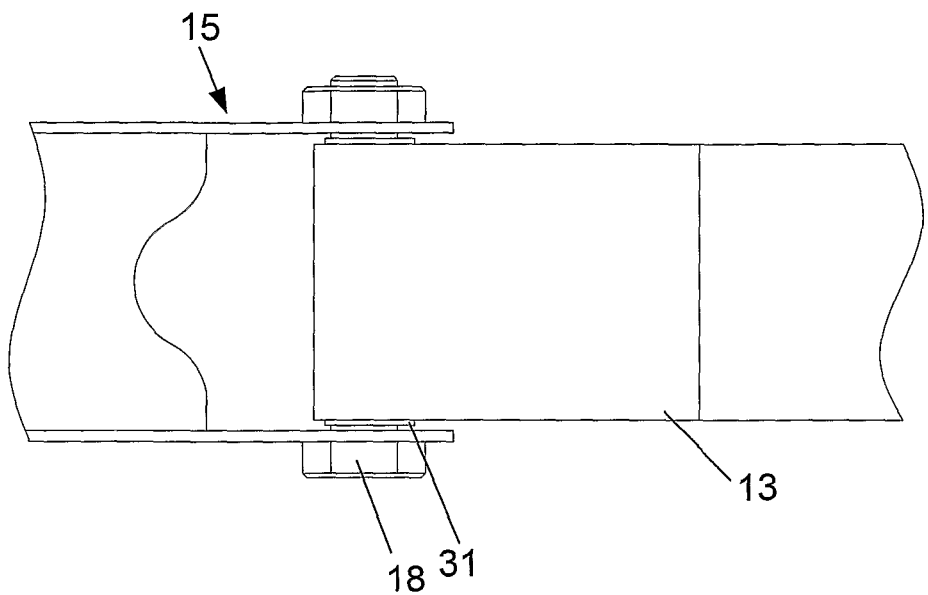
Figure 3B:
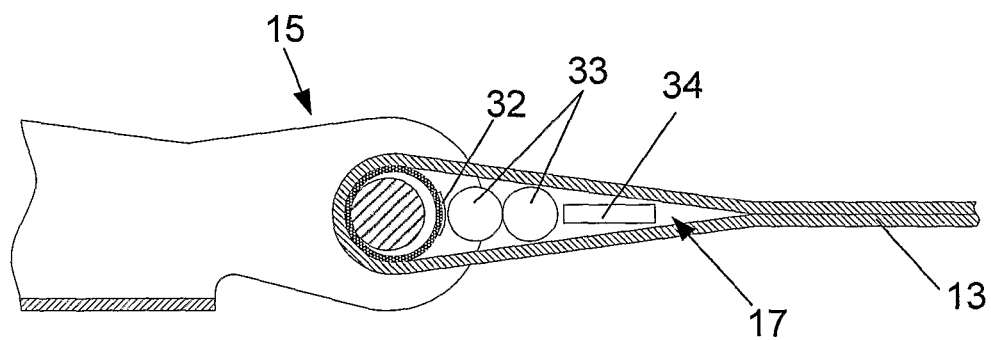
Figure 3C:
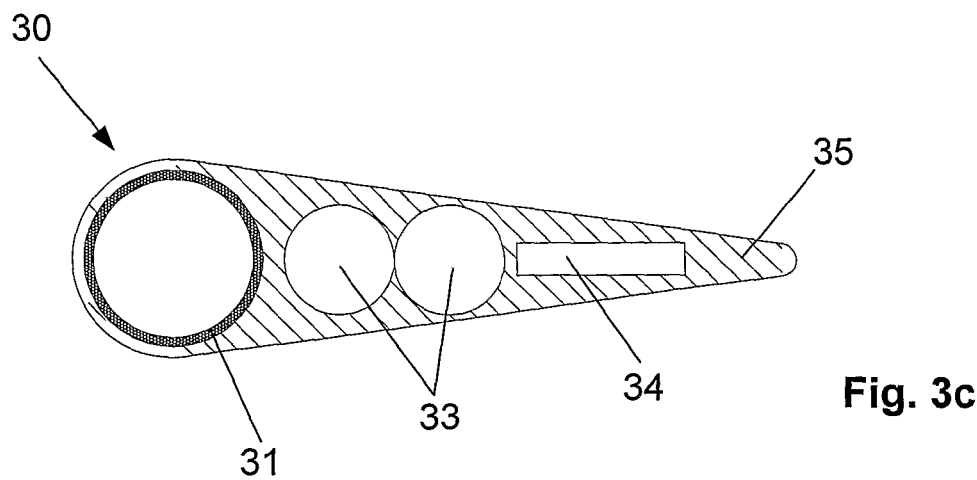
Figure 4A:
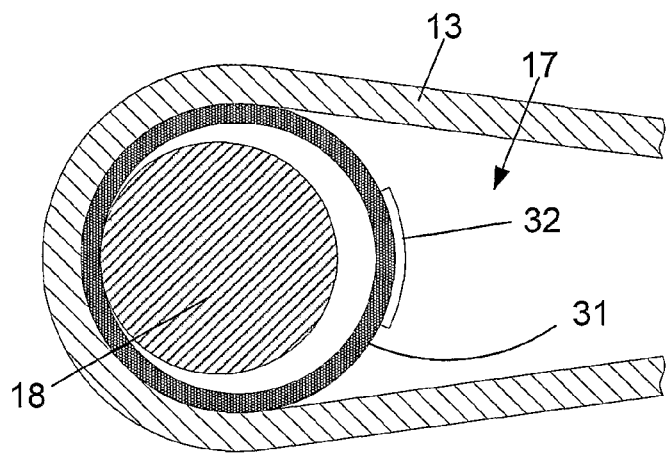
Figure 4B:
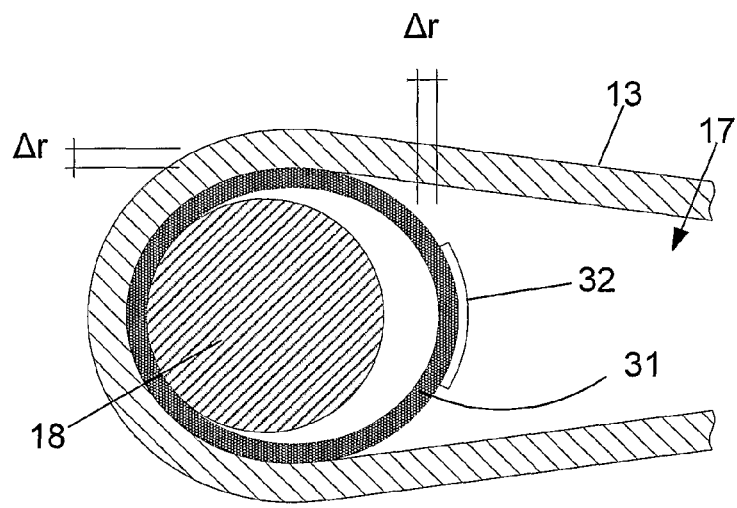
Figure 5:
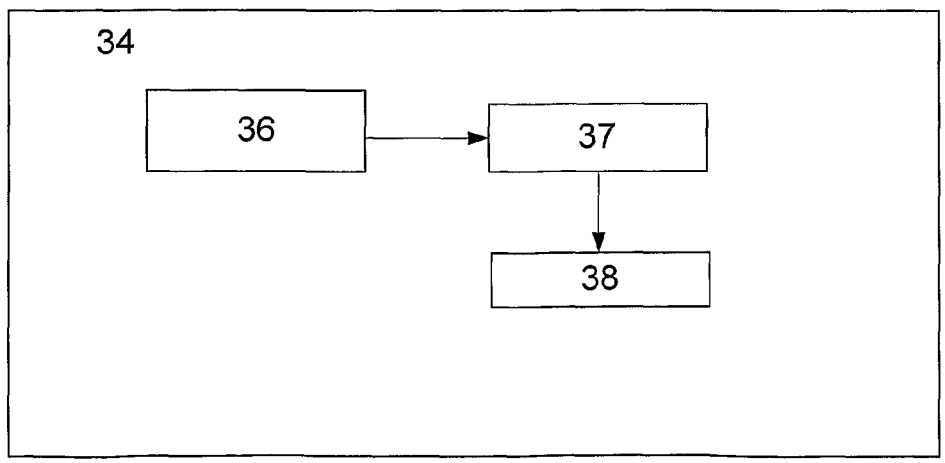
Figure 6A:
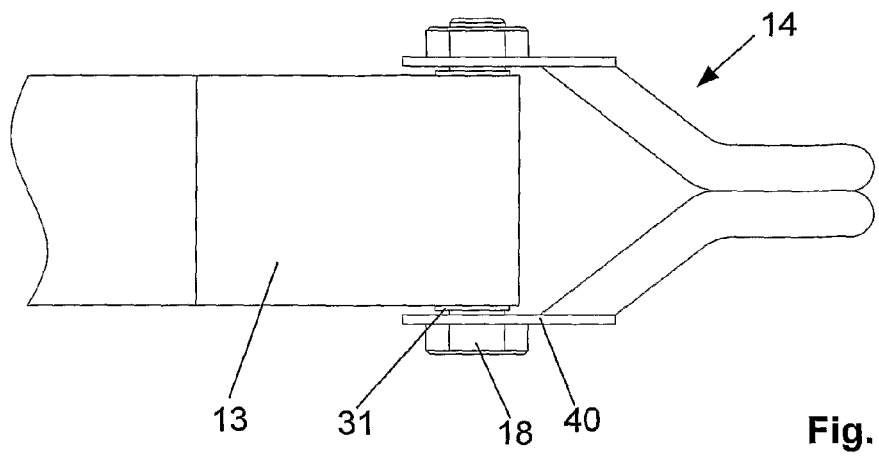
Figure 6B:
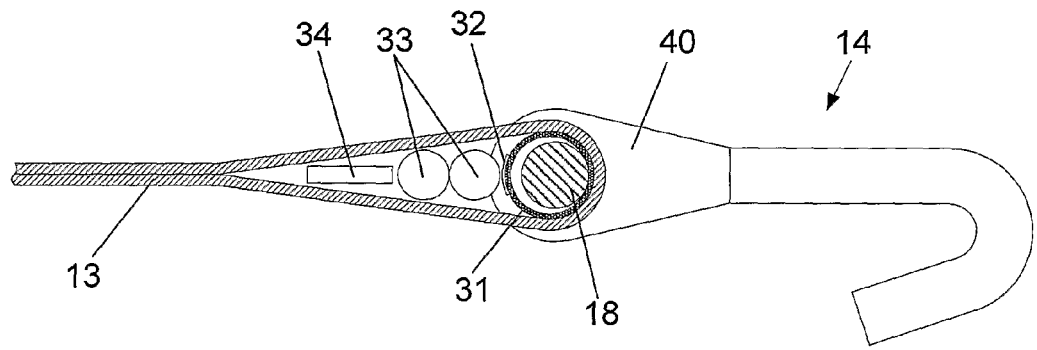
Figure 7A:
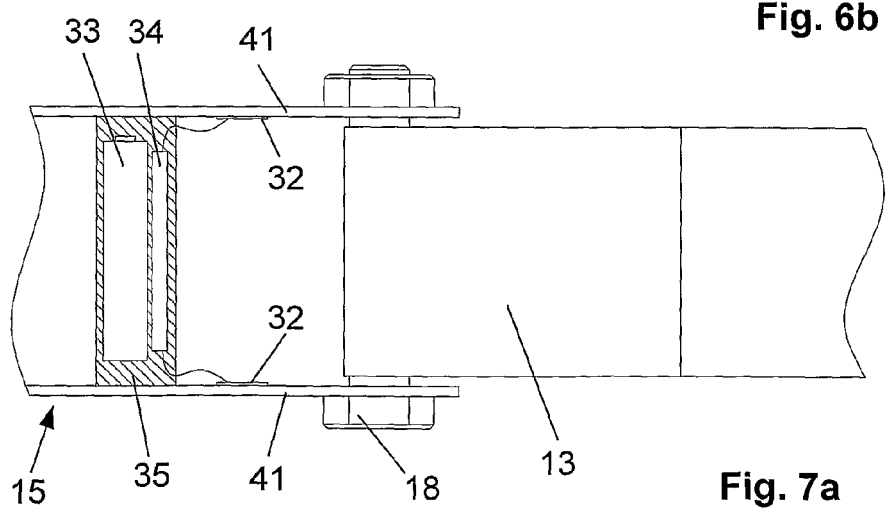
Figure 7B:
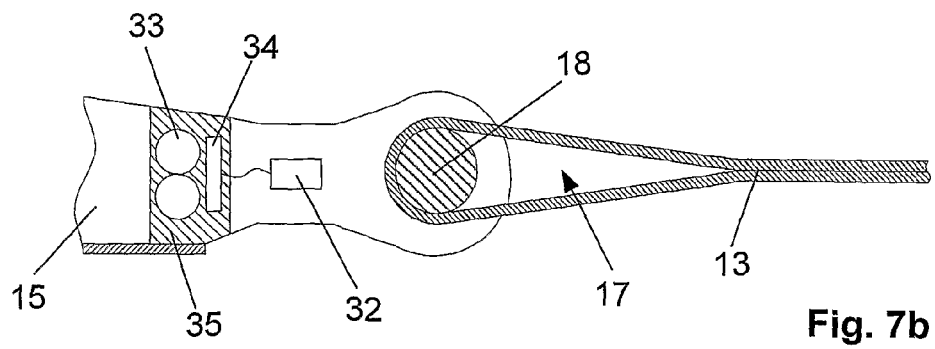
Figure 8A:
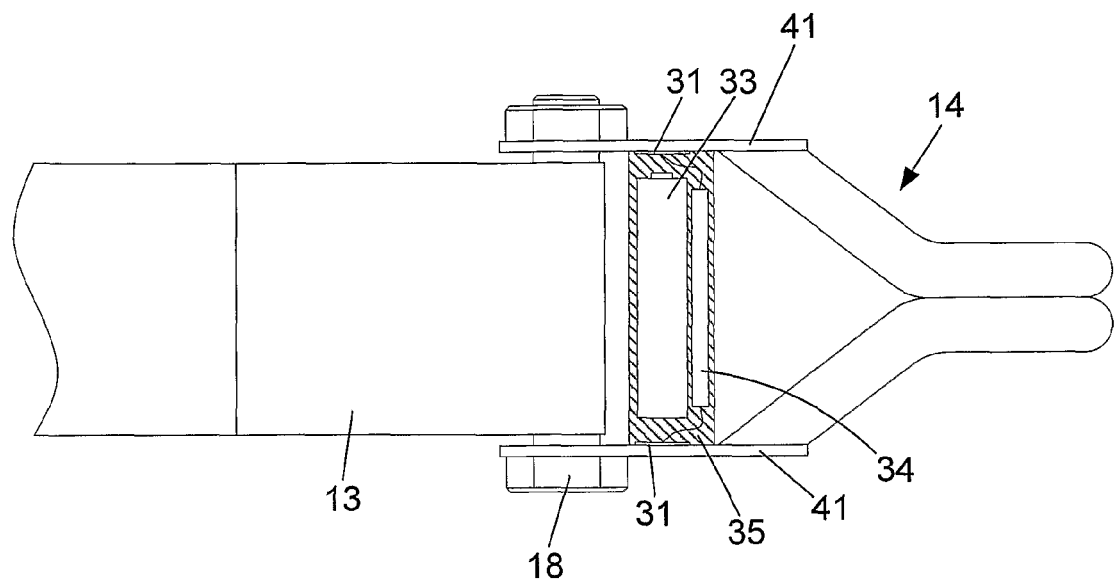
Figure 8B:
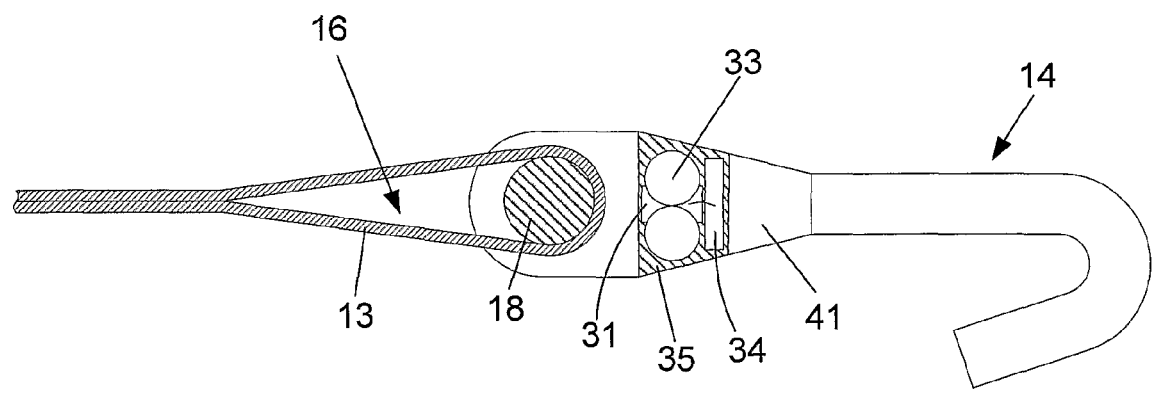
Figure 9A:
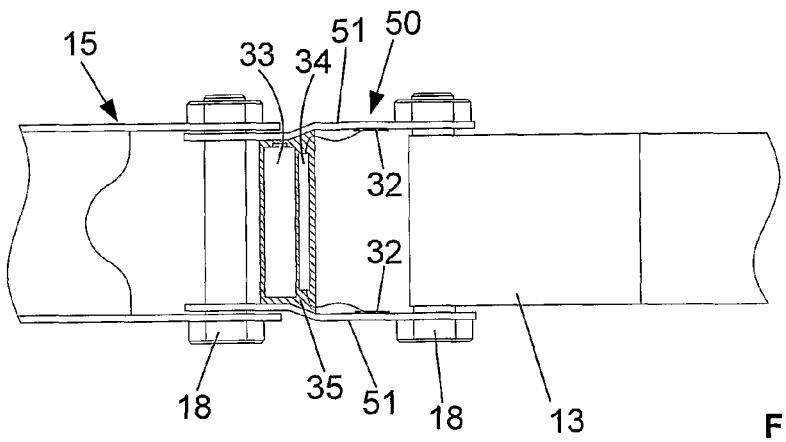
Figure 9B:
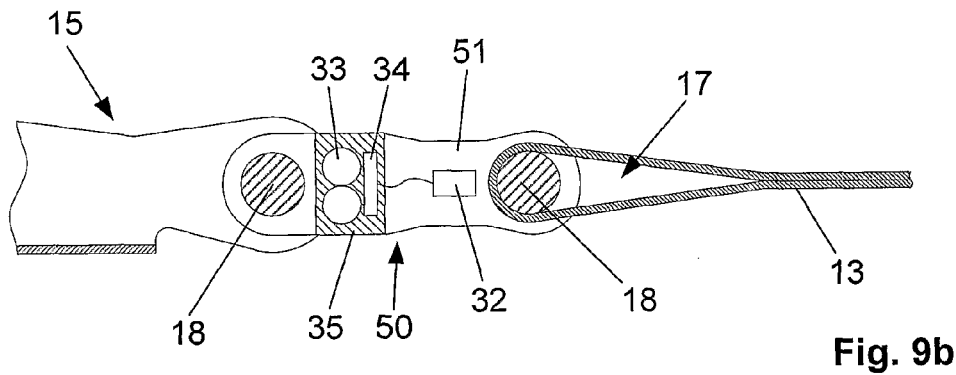
Figure 9C:
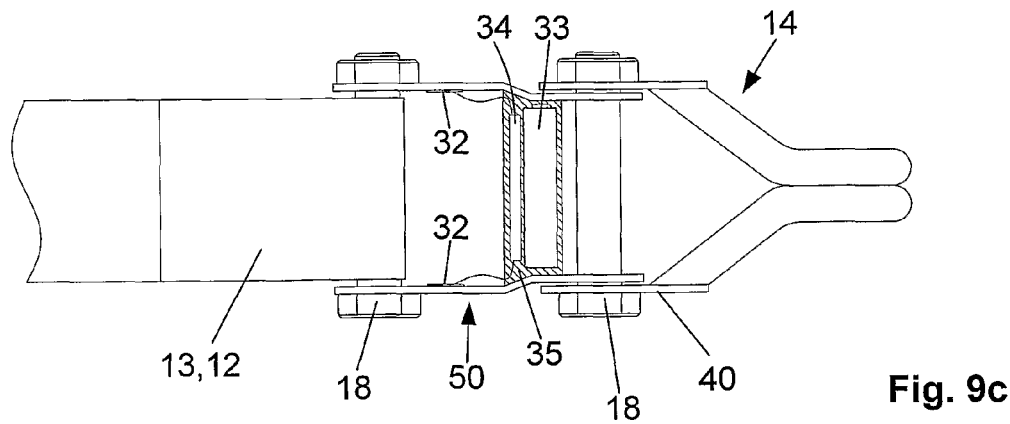
Figure 9D:
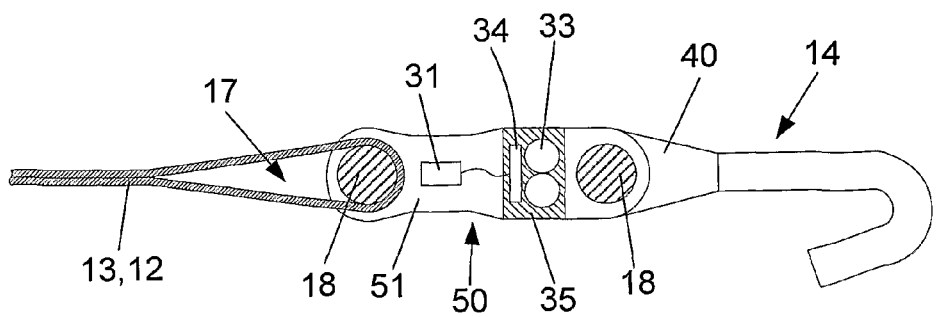
Figure 10A:
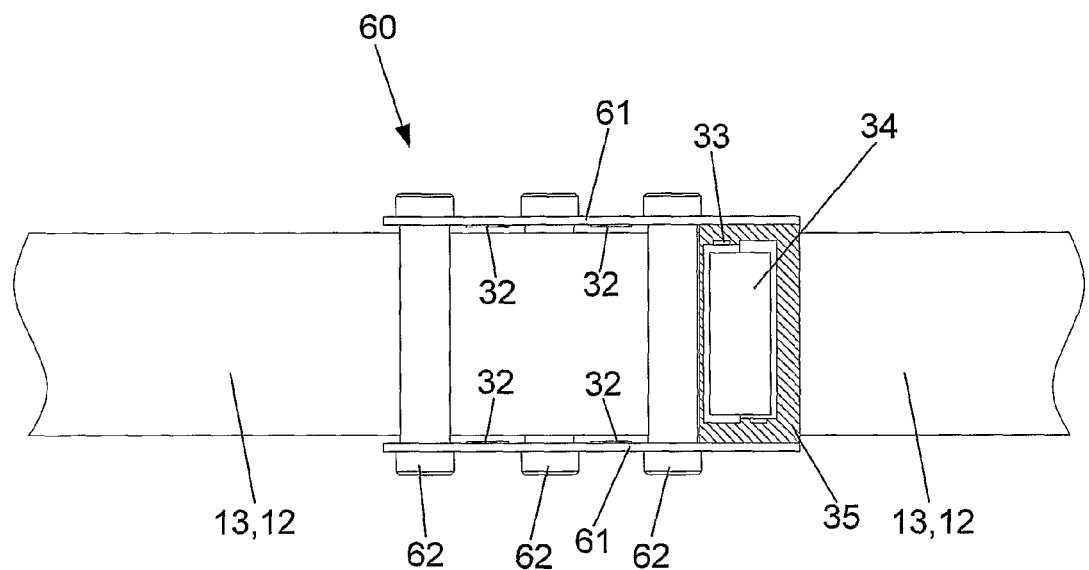
Figure 10B:
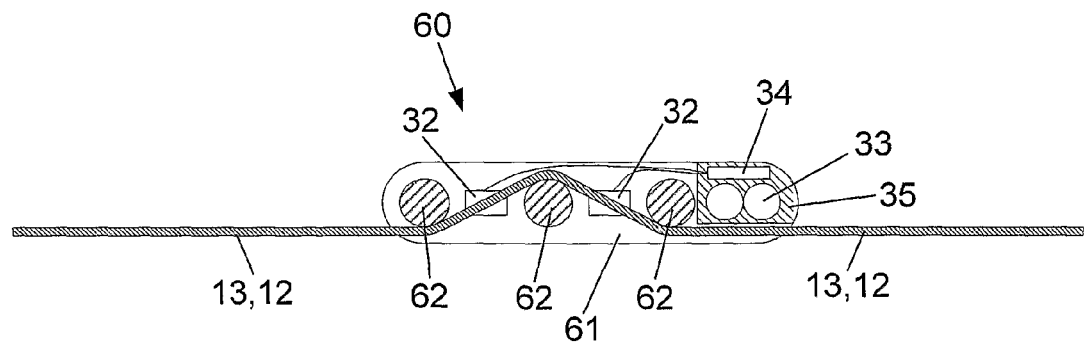
Figure 11A:
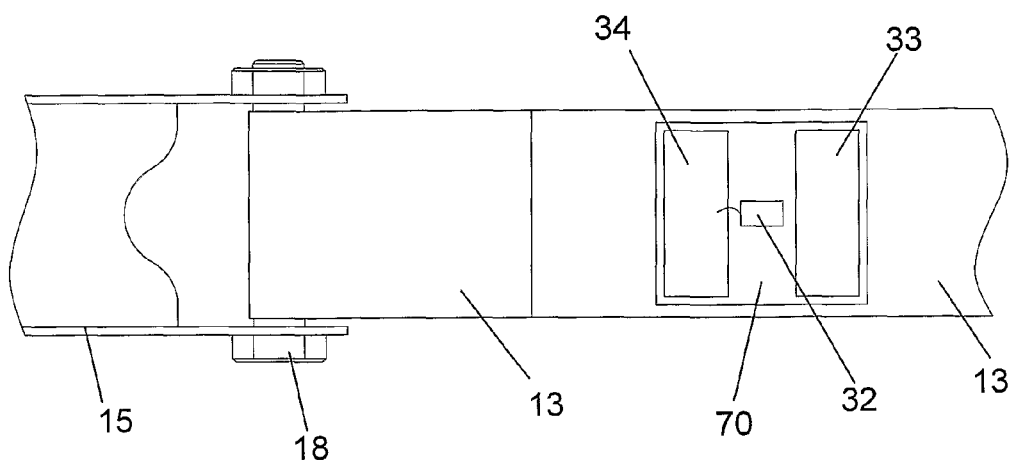
Figure 11B:
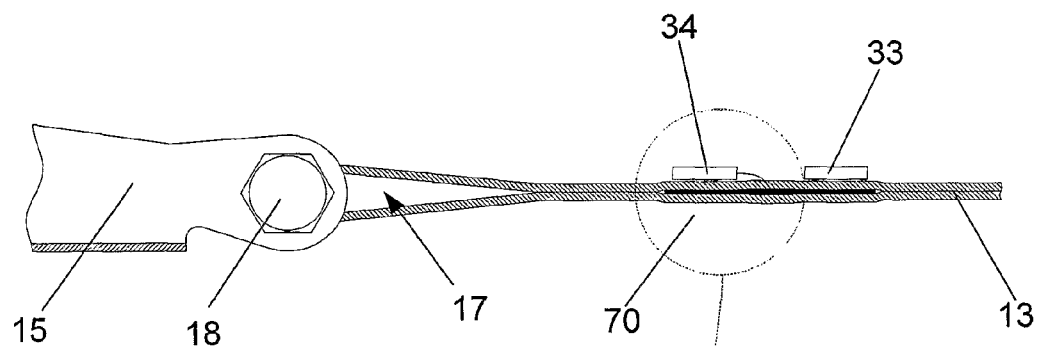
Figure 11C:
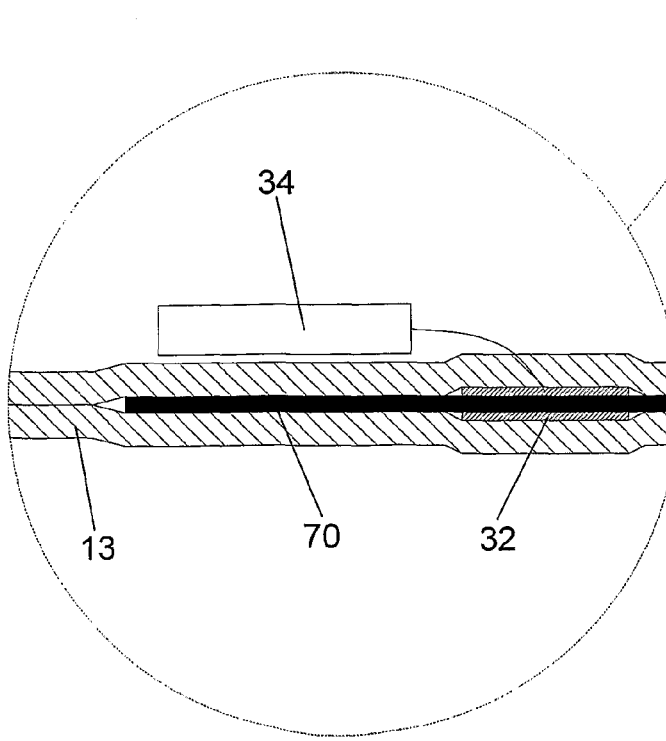
Figure 13A:
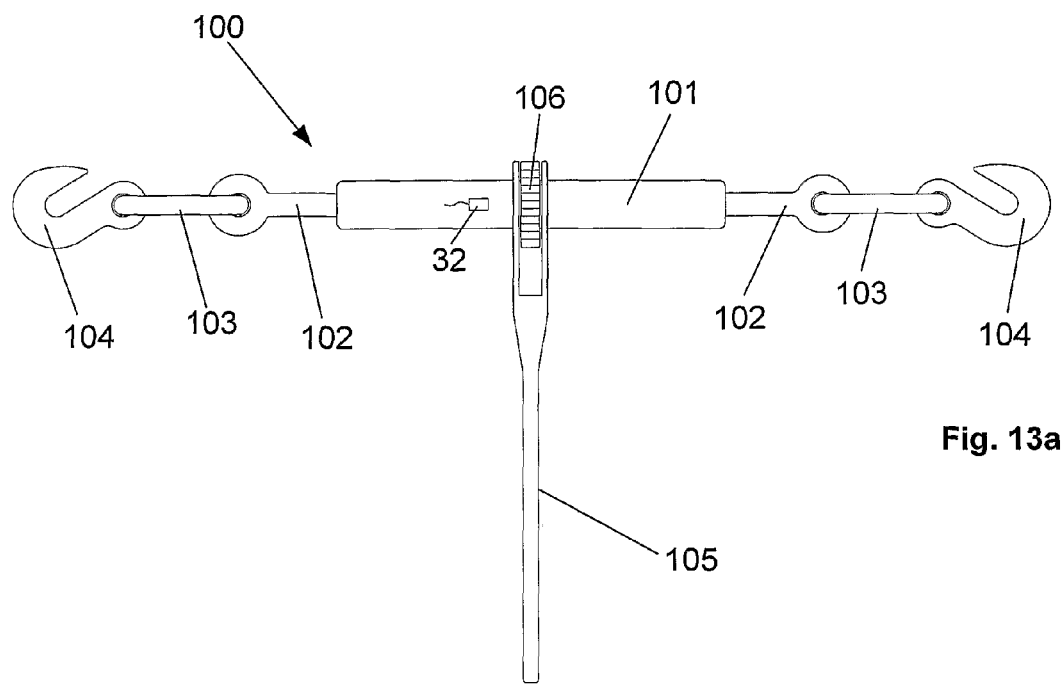
Figure 13B:
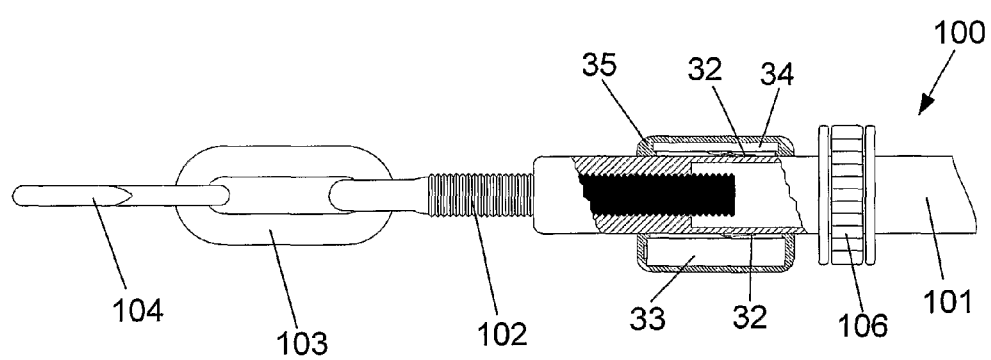
Figure 13C:
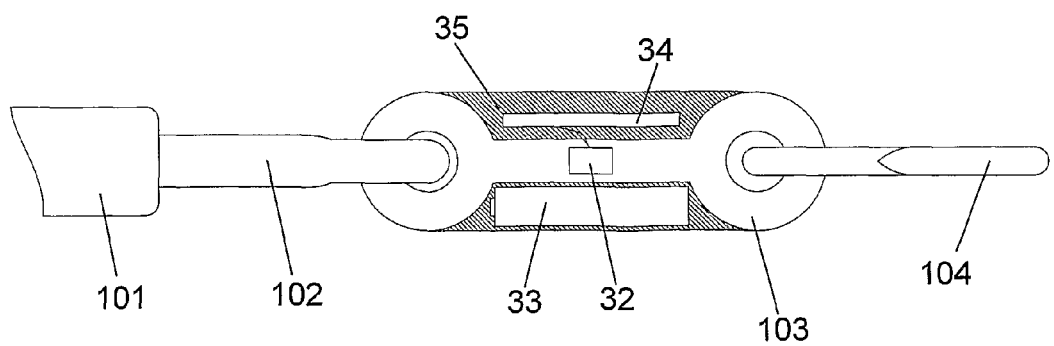

The invention will below be described in detail according to examples of embodiments with references to the drawings, where:

FIG. 1a-b is an example of a common fastener in the form of a ratchet strap, seen from above and from the side, respectively, FIG. 2 shows different positions of a sensor unit according to the invention for monitoring the state of the fasteners, FIG. 3a-c shows a first embodiment according to the invention, FIG. 4a-b show details of the measuring principle of the first embodiment, FIG. 5 is a simplified block diagram of a circuit card for the sensor unit, FIG. 6a-b shows a second embodiment according to the invention, FIG. 7a-b shows a third embodiment according to the invention, FIG. 8a-b shows a fourth embodiment according to the invention, FIG. 9a-d shows a fifth embodiment according to the invention, FIG. 10a-b shows a sixth embodiment according to the invention, FIG. 11a-c shows a seventh embodiment according to the invention, FIG. 12a-d shows an eight embodiment according to the invention, FIG. 13a shows a common tensioning device in the form of a compactor ratchet, FIG. 13b shows a ninth embodiment according to the invention, and FIG. 13c shows a tenth embodiment according to the invention, The following example description of the invention will mainly be described with relation to fasteners in the form of ratchet straps, but it is obvious that the invention also can be used for other fasteners, such as chains, wires, ropes, and bars or similar.

A fastener in the form of a common ratchet strap with tensioning is shown in FIG. 1a-b. Ratchet straps used to secure objects on a load carrier are manufactured, for example, of polyester thread and/or nylon thread, woven together to a belt (usually 50 or 75 mm wide). The belt is usually partitioned into a long part 12 (FIG. 2) (9-10 m long) which is in contact with the object to be secured, and a short part 13 (0.5 m long) having a tensioning device 15, as shown in FIG. 1a-b. Both the long part 12 and the short part 13 are preferably provided with fastening means 14 at one of the ends, such as an attachment hook (J-hook, T-hook, ring, etc.) or other suitable means. The fastening means 14, which in the shown example is a hook, is attached to the belt 13 by that the belt 13 is arranged around the fastening eye of the hook and sewn together with, for example, polyester and/or nylon thread. The short part 13, which is shown in FIG. 1a-b, has an attachment hook 14 at one end and is connected with a tensioning device 15 at the other end. The belt 13 is arranged triply and sewn together with, for example, polyester and/or nylon thread, so that an eye/a loop 16, 17 is formed at each end of the belt 13, where the attachment hook 14 is arranged in one eye 16 and a fastening bolt 18 of the tensioning device 15 is arranged in the other eye 17. The long part 12 of the ratchet strap is in the same way provided with an attachment hook 14 arranged in an eye 16 at the one end. The two parts of the ratchet strap, i.e. the long part 12 and short part 13 with a tensioning device 15, are assembled together in that the loose end of the long part 12 is inserted into the tensioning device 15 of the short part 13, and the belt 12 is tensioned by means of a tensioning handle 19. This is prior art and is for that reason not described further herein.

Referring now to FIG. 2 which shows possible positions for a sensor unit according to the invention, for the measuring/monitoring of the state of a ratchet strap, as described above, which is used to secure an object 20 positioned on a load carrier 21 provided with attachment devices 22, such as a hook attachment. As shown in FIG. 2, a sensor unit according to the invention can be arranged at many different positions, exemplified by positions shown in FIG. 2, to monitor the state of the ratchet strap. With the basis of FIG. 2, different embodiments will now be described.

Reference is now made to FIG. 3a-c, which show a first embodiment of the invention adapted for being positioned in connection with a tensioning device 15 of the fastener, i.e. the ratchet strap, as indicated as P1 in FIG. 2. FIGS. 3a-b show a sensor unit 30 according to the invention arranged to a tensioning device 15, while FIG. 3c shows details of the sensor unit 30. According to a first embodiment of the invention, a sensor unit 30 according to the invention includes an elastic deformable element in the form of a sleeve 31, a measuring element 32, power supply means 33 and an electronics card 34, which are encapsulated in a protective housing 35 of suitable material. The protective housing is not shown in FIG. 3a-b.

The electronics card 34, which is shown as a simplified block diagram in FIG. 5, further includes one or more measuring amplifiers 26, a control unit 37 (for example a microcontroller) and communication means 38, such as a radio transmitter (possibly also receiver) or alternatively wires, and necessary adaption electronics (not shown).

The protective housing 35 of the sensor unit 30 has a size and design which provides arrangement in a plain manner in the loop 17 in connection with the fastening bolt 18 of the fastener. The housing 35 has preferably a drop-shape. At that the tensioning device 15, the one eye 17 of the belt 13 usually extends around a fastening bolt 18. According to a first embodiment of the invention, the sensor unit 30 is arranged via the sleeve 31 to the fastening bolt 18 of the tensioning device 15, by that the fastening bolt 18 extends through the sleeve 31, so that the forces from the belt 13 result in an elastic deformation of the sleeve 31, asymmetrical in relation to the cross section of the sleeve 31. FIGS. 4a and 4b show the elastic deformation of the sleeve 31, idle (FIG. 4a) and with full load (FIG. 4b), respectively. The measuring element(s) 32 of the sensor unit 30 for tension/pressure is/are arranged at the outside and/or inside of the sleeve 31, advantageously at the side which is not in contact with the belt 13, and joined together with the sleeve 31 in such a way that tension in the measuring element 32 is representative for radial tension/pressure in the sleeve 31.

The measuring element 32 preferably exhibits properties for changing electrical wire resistance and/or exhibits properties for changing capacitance and/or exhibits properties for changing inductance and/or exhibits properties for changing a magnetic field and/or exhibits properties for changing optical connection or phase information with varying tension force and/or tension and/or pressure and/or bending moment and/or shear force, and/or exhibits properties for generation of an electrical potential as a consequence of mechanical affection in one or more axes. Alternatively, the measuring element 32 can be a multi-axed force sensor. An example of a measuring element which exhibits properties for changing electrical wire resistance with varying tension force and/or tension and/or pressure and/or bending moment and/or shear force is a strain gauge. An example of a measuring element which exhibits properties for generating an electrical potential is a piezoelectric element.

By that the measuring element 32, for example, is a strain gauge, the electrical wire resistance will be changed with, for example, varying deformation of the elastic element and/or by that the electric resistance is changed in another way, for example, as a consequence of tension force.

By that the measuring element 32 exhibits properties for changing capacitance, the capacitance between two electrodes will, as the distance between the electrodes is changing with, for example, varying deformation of the elastic element and/or that deformation of the elastic element affects, for example, the capacitance between two fixed electrodes in the measuring element and/or that the capacitance between two electrodes in some other way changes as a consequence of varying tension force.

By that the measuring element 32 exhibits properties for changing inductance, the electromagnetic field will change from, for example, induction caused by varying deformation of the elastic element and/or that an electromagnetic field is changed at induction in some other way, as a consequence of varying tension force.

By that the measuring element 32 exhibits properties for changing a magnetic field, the magnetic field will change with, for example, varying deformation of the elastic element and/or the magnetic field is changed in some other way, as a consequence of tension force.

By that the measuring element 32 exhibits properties to change optical connection or phase information, the optical connection in the element and/or phase information is changed with, for example, varying deformation of the elastic element and/or that the optical connection and/or phase information in the element is changed in some other way, as a consequence of varying tension force.

The measuring element 32 constitutes preferably a part of a resistive measuring bridge, for example a Wheatstone bridge (not shown), and the output from this is a measuring signal which represents the tension and/or pressure in the cross section of the sleeve 31. As can be seen from FIGS. 4a and 4b, the difference between idle and full load is a Δr, which can be measured by the measuring element 32. The signal from the measuring element 32 is then provided to the measuring amplifier(s) 36 of the electronics card 34 which amplifies the signal to a level which is adapted digitalization and further processing.

As the tension force in the belt 13 increases, the electrical signal will increase proportionally. After digitalization, the measuring values are represented as numbers, and can be processed further with suitable software by, for example, a microcontroller 37 which is arranged in connection with the electronics card 34. The non-linearity in the measurements can be compensated by providing the microcontroller 37 with software for this, so that a linear connection between the tension force and measured value for the entire measure range can be achieved. If desirable, the measuring signal can further be converted to metric values (Kg) for tension force. The software of the microcontroller 37 and/or an associated unit determines how often measurements are to be performed, and to save power, the measuring bridge/measuring element is only connected electrically when measurements are preformed.

Preferably, an encapsulation is in addition arranged around the fastener which protects the sensor unit 30 against humidity and dirt, after it is arranged to the fastener.

Each sensor unit 30 is in addition advantageously provided with an ID code which makes it recognizable for an external unit.

In a first embodiment, as shown in FIGS. 3a-c, the sensor unit 30 can acquire force information between the belt 13 and the fastening bolt 18 of the tensioning device without introducing a new element with the responsibility for force transmission, i.e. the belt 13 has still the responsibility.

The sensor unit 30 can thus send information about the state of the load securing means to an external unit by being provided with suitable communication means 38, preferably wireless means, such as a radio transmitter, but wires can also be used.

Reference is now made to FIGS. 6a-b which show a second embodiment of the invention, which is adapted for arrangement in connection with the fastening means 14 of the fastener, i.e. the attachment hook or fastening means arranged at the end of the long 12 and short 13 part of the ratchet strap, indicated as P2 in FIG. 2. As shown in FIG. 5a, the fastening means 14 includes here a supporting construction 40 which connects the attachment hook 14 to the fastener, i.e. the belt 12, 13, via a fastening bolt 18. The sensor unit 30 is designed in the same way as the first embodiment, but it is instead arranged in connection with the tensioning device 15, arranged in connection with the fastening means 14 and the loop 16. The sensor unit 30 will thus work in the same way as in the first embodiment, except that you here measure tension force, either at the fastening means 14 of the short part of the fastener or at the fastening means at the end of the long part of the fastener. It is pointed out that the protective housing 35 is not shown in FIGS. 6a-b. Thus, the sensor unit will work in the same way as in the former embodiment.

Reference is now made to FIG. 7a-b which show a third embodiment of the invention, adapted for arrangement in connection with the tensioning device 15 of the fastener, indicated as P3 in FIG. 2. According to the third embodiment, the sensor unit 30 is arranged in the tensioning device 15. One or more measuring elements 32 are arranged to or integrated in one or more supporting constructions 41 of the tensioning device 15. The measuring element(s) 32, as in the former embodiments, is/are connected with an electronics card 34 and power supply 33 which are encapsulated in a housing 35, which is adapted to be arranged to the tensioning device 15, preferably between two supporting constructions 41 of the tensioning device 15, so that the sensor unit 30 lies protected in the tensioning device 15. The advantage with this positioning is that the sensor unit is well protected and that it is the tensioning device 15 which is the key component in the load securing system in relation to warning and measuring the state of the fastener. This also results in that the tensioning device 15 can be used on other belts 13, since wear parts such as belts in this way can be replaced and keeps the tensioning device 15 with the sensor unit 30.

The measuring element(s) 32 in this embodiment will capture tension and/or pressure and/or bending moment and/or shear force in the tensioning device 15, proportionally with the tension force. The sensor unit will beyond this work in the same way as the former embodiments.

Reference is now made to FIGS. 8a-b which show a fourth embodiment of the invention, adapted for arrangement in connection with the fastening means 14 of the fastener, indicated as P4 in FIG. 2. The sensor unit 30 can be arranged to or integrated in one or more supporting constructions 40 of the fastening means 14, so that it can measure tension and/or pressure and/or bending moment and/or shear force in the fastening means 14. The measuring element(s) 32 is/are in the same way as the former embodiments connected with an electronics card 34 and power supply 33 which are encapsulated in a housing 35, adapted for arrangement to the fastening means 14, preferably between two supporting constructions 40 of the fastening means 14, so that the sensor unit lies protected in the fastening means 14 and becomes a compact and robust unit. The advantage with this position is a high degree of integration and protection for vulnerable components, and that the belt 12, 13 can be replaced if worn. This solution is suitable for fastening means 14 for both short 13 and long 12 part of the fastener.

Reference is now made to FIGS. 9a-d which show a fifth embodiment of the invention which is adapted for arrangement of the sensor unit 30 in connection with a connection link 50, which can be arranged between the tensioning device 15 and the short 13 part of the fastener (FIG. 9a-b), indicated as P5 in FIG. 2, or between fastening means 14 for the fastener and the short 13 or long 12 part of the fastener (FIG. 9c-d), i.e. the ratchet strap, indicated as P6 in FIG. 2. FIGS. 9a-b show the use of a connection link 50 between the tensioning device 15 and short 13 part of a fastener, where the connection link 50 is adapted for attachment to the tensioning device 15 via supporting constructions 51 of the connection link 50, by means of fastening bolts 18. FIG. 9c-d show the use of a connection link 50 between a fastening means 14 and short 13 or long 12 part of a fastener, where the connection link 50 is adapted for attachment to supporting constructions 51 of the connection link 50, by means of fastening bolts 18. In the fifth embodiment, one or more measuring elements 32 are arranged to or integrated in one or more supporting constructions 51 of the connection link 50. The measuring element(s) 32 is/are, in the same way as in the former embodiments, connected with an electronics card 34 and power supply 33, which are encapsulated in a housing 35 adapted to be arranged to the connection link 50, preferably between two supporting constructions 51 of the connection link 50, so that the sensor unit 30 lies protected in the connection link 50. The advantage of this embodiment is that it is easy to mount to already existing strap material without the need for large modifications, other than insertion of a connection link 50 of known type whereto the sensor unit is arranged. The sensor unit will thus in the same way as described above, measure the tension and/or pressure and/or bending moment acting on the supporting constructions 51 of the connection link 51.

Reference is now made to FIG. 10a-b which show a sixth embodiment of the invention, adapted for arrangement on a fastener, indicated as P7 in FIG. 2. According to the sixth embodiment, the system includes an easily detachable unit 60 which can be arranged on the fastener itself, either on short 13 or long 12 parts. The detachable unit 60 is formed by a supporting construction, e.g., in the form of two vertical side plates 61 and/or top and/or bottom plates (not shown), where support points 62 (e.g. bolts) extend between said side plates 61, where the support points 62 are distributed along the vertical side plates 61, so that the fastener, at arrangement, is curled and inserted in the detachable unit 60 and fixed in a suitable way, for example, in that a middle support point/bolt is removed and inserted again after the belt is arranged in place (not shown). It is obvious that the detachable unit 60 may be formed by another construction which is suitable to connect the vertical support points 62. The belt 12, 13 can, for example, bear against the detachable unit at three points, e.g. around three bolts 62, in the pattern "over, under and over", i.e. the fastener bears against three points of the detachable unit 60, so that a bending moment and/or shear force is generated in the supporting construction 61 of the detachable unit 60, as the fastener is stretched. The detachable unit 60 is further provided with a sensor unit 30 as described in the embodiments above, i.e. that the sensor unit 30 includes measuring elements 32, power supply 33 and electronics card 34 encapsulated in a protective housing 35. The measuring elements 32 can be arranged in several ways to measure tension/pressure stress and/or shear stress, dependent on the design. In the shown example, the measuring elements 32 are arranged to or integrated in the longitudinal side plates 61. Otherwise the sensor unit works as described in the embodiments above. The advantage of this configuration is that it is easy to attach and detach, so that it can be moved and used after need. The user and/or the owner of the warning system can easily detach the sensor unit to ensure the investment if the securing material is handed over to another user. Another advantage of this embodiment is that it can be used for ratchet straps, wires, ropes, and bars and similar without the need for large modifications.

Reference is now made to FIGS. 11a-c showing a seventh embodiment according to the invention, adapted for arrangement in the fastener itself, especially in a ratchet strap, preferably near the end of short 13 or long 12 parts, indicated as P8 in FIG. 2. An example of arrangement in connection with a short 13 part of a ratchet strap is shown in FIGS. 11a-c. One or more measuring elements 32 are arranged to or integrated in a suitable material 70, such as a stretch plate, which can be integrated into the fastener itself, i.e. the ratchet strap, for example by that it is sewn in between the strap layers in the short 13 or long 12 parts of the strap. The short part of a ratchet strap, as mentioned above, usually consists of three layers which are sewn together with, for example, polyester thread and/or nylon thread. Electronics card 34 and power supply 33 can be arranged in the strap together with the measuring elements 32 or in a suitable extension which bulge out from the strap, which is encapsulated in a suitable way for protection, or in the eye/loop 16, 17 in that the measuring elements 32 are arranged in the vicinity of these. The stretch plate will be stretched together with the strap and the measuring elements will thus be able to measure the tension in the strap, and thus the forces acting on the strap. Otherwise the sensor unit works in the same way as in the other embodiments.

Reference is now made to FIGS. 12a-d which show an eight embodiment of the invention, adapted for arrangement in connection with attachment devices 22 of a load carrier 21, indicated as P9 and P10 in FIG. 2. Load carriers 21, such as trucks or similar, are provided with attachment devices 22, such as hook attachments 80. According to an eight embodiment, two examples will now be described.

Reference is now made to FIGS. 12a-b which show a first example of the arrangement of a sensor unit 30 to attachment devices 22 of a load carrier 21, indicated as P9 in FIG. 2. The attachment devices 22 are formed by a supporting construction 80 which can be supported in a support 81 connected to the load carrier, such as, for example, under the floor of a carrier body. One or more measuring elements 32 are arranged to or integrated in the supporting construction 80 of the attachment device 22. The measuring element(s) 32 is/are in the same way as in the former embodiments connected to an electronics card 34 and power supply, which can be encapsulated in a housing (not shown) adapted for arrangement to the attachment device 22, and in this way a compact and robust unit is provided. Alternatively, the electronics card 34 and power supply 33 can be arranged under the load carrier 21 in a suitable manner. In this way the measuring elements 32 can measure tension and/or pressure and/or bending moment and/or tension force and/or shear force in the supporting construction 80 of the attachment device 22. The advantage of this configuration is that the sensor unit 30 follows the load carrier 21. In addition the position of each sensor unit will be known, and it will be convenient and rapid for the user to identify which sensor unit an alarm is concerned with, and thus rapidly can carry out actions. An advantage of this embodiment is also that one easily can use wiring for power supply and/or communication with a base unit if it is desirable. By the use of wiring between the sensor units of a load carrier, the communication between the load carrier and one or more external units in the environment of the user can be performed, for example, by means of wireless means, such as radio transmitters and/or receivers.

Reference is now made to FIGS. 12c-d which shows a second example of arrangement of a sensor unit between attachment devices 22 and the load carrier 21, indicated as P10 in FIG. 2. The attachment devices 22 are formed in the same way as described above, but as opposed to the measuring elements 32 being integrated in or arranged to a supporting construction of the attachment device 22, the measuring elements 32 are arranged in the support 81 of the attachment device 22 and/or between the support 81 of the attachment device 22 and the load carrier 21. The measuring element 32 in this embodiment is preferably multi-axed, e.g. a three-axed measuring element 32. In this way the measuring element 32 can measure tension and/or pressure and/or bending moment and/or shear force as a consequence of the tension force in the attachment device 22. The measuring element(s) 32 is/are in the same way as in the last example connected with an electronics card 34 and power supply 33, preferably arranged in and/or below the load carrier 21 in a suitable way. The advantage of this design is that the sensor unit 30 and the measuring element 32 can be integrated in the load carrier 21 and, for example, lay hidden under the load body of a transport means. The sensor unit 30 thus lies well protected, is fixed positioned and is an integrated part of the load carrier 21. The signals can be transferred wireless or by wiring to an external unit, and the design also provides opportunities for power supply by wiring. By the use of wiring between the sensor units of a load carrier, the communication between the load carrier and one or more external units in the environment of the user can be performed, for example, by means of wireless means, such as radio transmitters and/or receivers. In addition the advantages mentioned above also apply for this example.

FIG. 13a shows a common tensioning device 100 which is often used in connection with chains, known as compactor ratchets. A common compactor ratchet 100 usually includes a threaded sleeve 101, from which threaded sleeve 101 two tension screws 102 extend to each side. To each tension screw 102, there is usually arranged a connection link 103, and to each connection link 103 fastening means 104 is arranged, such as chain hooks. The threaded sleeve 101 is provided with interior threads (not shown), adapted to the threads of the tension screws 102. The tensioning device 100 is further provided with a tensioning ratchet 105, arranged to a ratchet wheel 106 which is arranged to the threaded sleeve 101. The effect of the tensioning device 100 is well known and will thus not be further described herein.

Referring now to FIG. 13b which shows a ninth embodiment according to the invention, where the sensor unit 30 is arranged to or integrated in the compactor ratchet 100. One or more measuring elements 32 is/are arranged to or integrated in the threaded sleeve 101 of the compactor ratchet 100, which threaded sleeve 101 will be a support construction of the compactor ratchet 100. The measuring element(s) 32 is/are in the same way as the former embodiments connected to an electronics card 34 and power supply 33, which can be encapsulated in a housing 35, adapted for being arranged to the compactor ratchet 100, and in this way a compact and robust unit is provided. In this way the measuring elements 32 can measure tension and/or pressure and/or bending moment and/or tension force and/or shear force in the supporting construction of the compactor ratchet 100, as is the threaded sleeve 101, proportionally with the tension force. The advantage of this position is that the sensor unit 30 is connected to the compactor ratchet 100, which is the key component of the load securing system in connection with warning and measuring the state in fasteners with the use of chains. This also results in that the tensioning device 100 can be used with other fasteners, such as chains, wires and similar fasteners. An advantage is also that wear parts, such as chains and wires, in this way can be replaced and maintain the compactor ratchet 100 with the sensor unit 30.

FIG. 13c shows a parallel solution to the solution, among others, described in FIGS. 9a-d. According to a tenth embodiment of the invention, a sensor unit 30 is arranged to or integrated in a connection link 103. This is also an embodiment which can be used in connection with, for example, connection links for chains and extension links for wires. According to a tenth embodiment are one or more measuring elements 32 is/are arranged to or integrated in a supporting construction of a connection link 103. The measuring element (s) 32 is in the same way as in the former embodiments connected with an electronics card 34 and power supply 33, which are encapsulated in a housing 35, adapted to be arranged to the connection link 103, so that the sensor unit 30 lies protected in the connection link 103. The advantage of this embodiment is that it is easy to mount in, or instead of, already existing connection links 103 in connection with compactor ratchets 100, between links in chains, connection links for wires or similar, without the need for large modifications, other than arranging a sensor unit 30 to the connection link 103 or similar. An advantage of this embodiment is that the sensor unit 30 will follow the compactor ratchet 100, chain, wire or similar.

It should also be noted that the embodiments described under FIGS. 8a-b, in the same way can be implemented in a fastener with compactor ratchet, both in an attachment hook arranged close to the compactor ratchet and a hook arranged down against the attachment devices of the load carrier, and an element positioned at an arbitrary position of the fastener.

The above described embodiments can in the same way with plain modifications be used on, for example, wires with or without tensioning devices, ropes with or without tensioning devices or other elements for force transmission where tension and/or pressure and/or bending moment and/or tension force and/or shear force represents the load of the elements, by using the same principles as described above.

The friction between fasteners and goods result in that, in some cases, it is advantageous to use two or more sensor units per fastener to achieve more accurate force measurements at both sides of the strapped goods. This can easily be implemented by use of the invention which makes it possible to use the same measuring principle on different positions of a fastener. An advantage of using the same measuring principle is that same types of measurements and same type of evaluations of the measurements is achieved, and that one in this way can achieve a uniform system for measuring/monitoring the state of the fasteners.

Finally it should be mentioned that several of the above described embodiments easily can be combined and the invention can thus be used to monitor fasteners of different types which are combined with one another.

Modifications

Even if the description is based on ratchet straps and compactor ratchets, especially regarding trucks or trailers, it is obvious that the invention can be used for all types of transport means. The users of the invention could thus be all transporters, such as transport companies, truck owners, shipping companies, airlines, the military, etc. The invention can be utilized in connection with all types of transport and with all types of load carriers where there is a need for securing the gods with fasteners, such as, for example, road transport, railway transport, sea transport and air transport.

The focus of securing load on ships is increasing, where displacement of load can result in large consequences. The invention will thus be of great value for monitoring load securing on ships. An actual use will be, for example, the securing of a valuable load on supply ships for offshore activity.

The securing of vehicles onboard ferries is also a possible area of use, where it can be a requirement of attachment straps between the wheel of the vehicle and the ferry deck, and a continuous monitoring of this strapping will provide an early warning on failing tightness in the strapping.

Other possible areas of use could be fastening and anchoring, as for example, the monitoring of attachment wires for masts, and mooring of fish farms, shell farms and boats. The invention can also be used for monitoring the load in the anchoring of a mast rig of sailboats, for thus to find optimal spread of canvas and sailing course, and at the same time provide an early warning of a too high load of the anchoring of the rig. The sensor unit can also be used as a wireless load cell at lifting with cranes or winch. The sensor unit can also be used to warn about changes in the load of supporting constructions, for example, for fish farms, tribunes, floors or roofs, where the sensor unit constitutes a part of an element with the purpose of fastening and/or securing and/or anchoring the mentioned construction. This shows that there are many areas of use beyond the primary, which is load securing.

Even if it in most cases is preferred to have wireless communication between the sensor unit and an external unit, wires can be used instead. This is especially suitable if the sensor unit is arranged as described in FIGS. 12a-d.

Other variants than the embodiments described above can easily be emerged by new combinations of positions and other suitable construction elements.

The deformable element does not need to be a sleeve, as described in the example. The deformable element could have a shape and size adapted to the embodiment. The housing of the sensor unit can, for example, constitute a part of the deformable element. The deformable element can also be positioned exterior of the sensor unit, the deformable element can, for example, be an extended rectangle or a ball arranged in a loop of the ratchet strap, or it could be positioned, for example, in a connection link for a chain which allows for some movement in the normal direction, so that the elastic element is affected by this movement and thus can inform about the tension force. An elastic element arranged between two supporting constructions is also conceivable, integrated in the fastener, so that it is affected as the fastener is tensioned. This shows that the elastic element can have many different designs and that the description of a sleeve must not be interpreted as a limitation.

The measuring element can further, for example, be an integrated part of the electronics card by that it, for example, is arranged to the electronics card as a component and/or designed as a part the path pattern of the electronics card, so that it captures tension and/or pressure and/or bending moment and/or tension force and/or shear force in the electronics card itself, and/or in a protective housing, and/or in the cast-in, and/or a connected deformable element.

For industrial applicability of the invention, a high degree of integration will be desirable and the principles described in the application will be combined and utilized in a way which is effective with regard to build volume, positioning, power consumption, material consumption and production costs. The principles can thus be used both in large and small physical design, the sensor unit can, for example, be integrated in an electronics circuit where the measuring element with the necessary elements and/or power supply means are integrated.

The power supply means can be locally stored energy in the form of batteries and/or secondary batteries and/or capacitive store mediums and/or distributed energy from any type of power source. The power supply can also be provided by an electromagnetic field which encloses the sensor unit, with a suitable frequency and strength for energy distribution and data communication.

The invention claimed is:

1. A sensor unit for remotely monitoring the state of fasteners which are being used for fastening, securing, and anchoring one or more objects, which fasteners include a fastening means for tensioning the fasteners, which fastening means, means for tensioning the fasteners, connection links and anchoring devices are provided with bolts, said sensor unit comprising:

at least one deformable sleeve, to which deformable sleeve at least one measuring element is arranged, wherein said deformable sleeve has a mainly circular shape in default state, wherein the deformable sleeve is arranged for surrounding the bolt or for arrangement in a loop formed at the end of flexible fasteners surrounding the bolt, such that the sleeve is not responsible for transmission of forces in the fasteners, which deformable sleeve is arranged for being asymmetrically deformed by a combination of axial and radial forces acting between the bolt and fasteners or between parts of the fasteners forming the loop or eye at the end of the fasteners and thereby measuring tensioning force straight after tensioning or static tension or pressure acting axially on the fasteners at a given point in time without affecting the fasteners.

2. The sensor unit according to claim 1, wherein two or more measuring elements are arranged to the deformable sleeve for summing axial and radial forces over a given measuring area, and connected to an amplifier which summarizes signals and presents a signal which represents the load over an area.

3. The sensor unit according to claim 1, wherein the measuring elements are at least two strain gauges and that at least two strain gauges are arranged perpendicular to each other at the deformable sleeve.

4. The sensor unit according to claim 1, wherein the measuring elements are arranged to the deformable sleeve constitutes a part of a measuring bridge, which measuring bridge can consist of both passive and active elements.

5. The sensor unit according to claim 1, wherein the sensor unit includes at least one deformable sleeve which is responsive to shear stress increasing with tension or pressure in the fasteners, which element is provided with measuring elements for measuring the experienced shear stress.

6. The sensor unit according to claim 1, wherein the sensor unit includes a protective housing adapted for arrangement in loops or eyes formed by at the end of flexible fasteners which extend around bolts and is adapted for enclosing the deformable sleeve.

7. The sensor unit according to claim 6, wherein the protective housing is formed as a part of the deformable sleeve, so that the deformable sleeve and the protective housing forms a deformable encapsulation wherein measuring elements are arranged, which encapsulation is adapted for arrangement in loops or eyes formed at the end of flexible fasteners extending around the bolts.

8. The sensor unit according to claim 1, wherein the sensor unit includes an electronics card.

9. The sensor unit according to claim 8, wherein the electronics card is arranged or integrated in a deformable protective housing, to which electronics card is arranged measuring elements for measuring tensioning force straight after tensioning or static tension or pressure acting axially on the fasteners at a given point in time via the deformable housing and the measuring elements on the electronics card without affecting the fasteners.

10. The sensor unit according to claim 8, wherein the electronics card includes one or more measuring amplifiers and that the sensor unit includes:
a control unit provided with software for controlling and calibrating the sensor unit;
software for processing of measured values form the measuring elements, and preferably software for compensating for non-linearity and scaling in the measurements, and provided with threshold values for critical situations, software for analyzing the measured values in relation to predefined parameters for critical situations for finding properties and trends in the measured values over time, or a pattern which indicate that an object is not secured properly at an early stage, and
communication means.

11. The sensor unit according to claim 4, wherein the measuring bridge is a Wheatstone which is connected with the electronics card and power supply means, which measuring bridge is arranged for one or more of the following features:
providing an electrical measuring signal from the measuring element,
providing balance for amplifying the difference between a signal and a reference,
compensating for unevenness in the distribution of forces, increasing the sensitivity and correction of side effects, and
compensating for expansion in a host material, as a consequence of temperature changes.

12. The sensor unit according to claim 1, wherein the measuring element includes an accelerometer.

13. The sensor unit according to claim 1, wherein the measuring element provides one or more of the following properties:
properties to change electrical resistance,
properties to change capacitance,
properties to change inductance,
properties to change a magnetic field or provide properties to change optical connection or phase information, or both,
with varying tension force straight after tensioning or static tension or pressure acting axially on the fasteners at a given point in time, and
properties to generate an electrical potential as a consequence of mechanical affection in one or more axes.

14. The sensor unit according to claim 1, wherein the sensor unit is comprises an ID code/encryption system; and arranged for:
receiving information, including changes of threshold values for critical situations, calibration and changing of ID code,
arranged for communication with one or more external units, either via wires, wirelessly, or both
and optionally,
sending information on status of the fasteners, status for power supply, errors and/or other relevant information to one or more external units.

15. The sensor unit according to claim 1, wherein the sensor unit comprises a means for
measuring and reporting other measured parameters including temperature, humidity, and acceleration, or
to warn about burglary or loss of secured objects,
or both.

16. A sensor unit for remotely monitoring the state of fasteners which are being used for fastening, securing, and anchoring one or more objects, wherein the fasteners comprise fastening means, means for tensioning the fasteners, and connection links or anchoring devices, wherein the fastening means, means for tensioning the fasteners, connection links and anchoring devices are provided with a bolt, said sensor unit comprising:
at least one elastic element, to which elastic element at least one measuring element is arranged or that the elastic element in itself constitutes an elastic measuring element, wherein the elastic element or elastic element provided with measuring elements are integrated in or arranged to the fasteners, the fastening means, connection links or anchoring devices, wherein the elastic element itself or elastic element provided with measuring elements is arranged for being affected by tension in the fastener to provide a value for the tensioning force straight after tensioning or static tension or pressure acting axially on the fasteners at a given point in time without affecting the fasteners.

17. The sensor unit according to claim 16, wherein the elastic element is a tensile plate.

18. The sensor unit according to claim 16, wherein two or more measuring elements are arranged to the deformable element or elastic element for summing axial and radial forces over a given measuring area, and connected to an amplifier which summarizes signals and presents a signal which represents the load over an area.

19. The sensor unit according to claim 16, wherein the measuring elements are arranged to the deformable element or elastic element constitutes a part of a measuring bridge, which measuring bridge can consist of both passive and active elements.

20. The sensor unit according to claim 16, wherein the sensor unit includes at least one deformable element or elastic element which is responsive to shear stress increasing with tension or pressure in the fasteners, wherein the element is provided with measuring elements for measuring the experienced shear stress.

21. The sensor unit according to claim 16, wherein the sensor unit includes a protective housing adapted for arrangement in loops or eyes formed by at the end of flexible fasteners which extend around bolts and is adapted for enclosing the deformable element or elastic element.

22. The sensor unit according to claim 21, wherein the protective housing is formed as a part of the deformable element or elastic element, so that the deformable element or elastic element and the protective housing forms a deformable encapsulation wherein measuring elements are arranged, wherein the encapsulation is adapted for arrangement in loops or eyes formed at the end of flexible fasteners extending around the bolts.

23. The sensor unit according to claim 16, wherein the sensor unit includes an electronics card.

24. The sensor unit according to claim 23, wherein the electronics card is arranged or integrated in a deformable protective housing, to which electronics card is arranged measuring elements for measuring tensioning force straight after tensioning or static tension or pressure acting axially on the fasteners at a given point in time via the deformable housing and the measuring elements on the electronics card without affecting the fasteners.

25. The sensor unit according to claim 23, wherein the electronics card includes one or more measuring amplifiers and that the sensor unit includes:
   a control unit provided with software for controlling and calibrating the sensor unit;
   software for processing of measured values from the measuring elements, and for compensating for non-linearity and scaling in the measurements, and provided with threshold values for critical situations, software for analyzing the measured values in relation to predefined parameters for critical situations for finding properties and trends in the measured values over time, or a pattern which indicate that an object is not secured properly at an early stage, and
   communication means.

26. The sensor unit according to claim 19, wherein the measuring bridge is a Wheatstone which is connected with the electronics card and power supply means, wherein the measuring bridge is arranged for one or more of the following features:
   providing an electrical measuring signal from the measuring element,
   providing balance for amplifying the difference between a signal and a reference,
   compensating for unevenness in the distribution of forces, increasing the sensitivity and correction of side effects, and
   compensating for expansion in a host material, as a consequence of temperature changes.

27. The sensor unit according to claim 16, wherein the measuring element includes an accelerometer.

28. The sensor unit according claim 16, wherein the measuring element provides one or more of the following properties:
   properties to change electrical resistance,
   properties to change capacitance,
   properties to change inductance,
   properties to change a magnetic field or to provide properties to change optical connection or phase information, or both,
   with varying tension force straight after tensioning or static tension or pressure acting axially on the fasteners at a given point in time,
   and,
   properties to generate an electrical potential as a consequence of mechanical affection in one or more axes.

29. The sensor unit according to claim 16, wherein the sensor unit is provided with an ID code/encryption system; and arranged for:
   receiving information, including changes of threshold values for critical situations, calibration and changing of ID code,
   arranged for communication with one or more external units, either via wires, wirelessly, or both,
   and optionally
   sending information on status of the fasteners, status for power supply, errors or other relevant information to one or more external units.

30. The sensor unit according to claim 16, wherein the sensor unit includes means for measuring and reporting other measured parameters of interest including temperature, humidity, and acceleration, to warn about burglary or loss of secured objects, or both.

31. A method for monitoring the state of fasteners which are being used for fastening, securing, or anchoring one or more objects, wherein the fasteners include a fastening means, means for tensioning of the fasteners, and possibly connection links or anchoring devices, wherein the fastening means, means for tensioning the fasteners, connection links and anchoring devices are provided with a bolt, wherein the method is executed by means of a sensor unit including at least one measuring element,
   wherein the method includes measuring tension force straight after tensioning or static tension or pressure acting axially on the fasteners at a given point in time without affecting the fasteners by means of one or more of:
   a sensor unit including at least one deformable sleeve element, to which deformable sleeve one or more measuring elements are arranged, wherein the deformable sleeve has a mainly circular shape in default state, wherein the deformable sleeve is arranged for surrounding the bolt or for arrangement in a loop formed at the end of flexible fasteners surrounding the bolt, such that the sleeve is not responsible for transmission of forces in the fasteners, wherein the asymmetric deformation of the deformable sleeve a combination of axial and radial forces acting between the bolt and fasteners or between parts of the fasteners forming the loop or eye at the end of the fasteners is measured to provide a value for tension force straight after tensioning or static tension or pressure acting axially on the fasteners at a given point in time, a sensor unit including at least one elastic element, to which elastic element one or more measuring elements are arranged or that the elastic element constitutes an elastic measuring element, wherein the elastic element or elastic element provided with measuring elements are integrated in or arranged to the fasteners, fastening means, connection links or anchoring devices where the elastic element or elastic element provided with measuring elements will when affected by tension in the fastener measure the tension in the fastener, and thus provide a value for the forces acting on the fastener.

32. Method according to claim 31, wherein the method includes combining measurements from different types of sensor units for providing several independent measuring results as a basis for interpretation of variations in tension force straight after tensioning or static tension or pressure acting axially on the fasteners at a given point in time, and avoiding that a frictional force over a tensioned object does not result in measurements with errors.

33. Method according to claim 31, wherein the method further includes one or more of the following steps:
    amplifying and linearizing the signal from the measuring element,
    digitalizing and buffering measured values,
    at least one of linearizing, scaling, and filtering measurements,
    analyzing the measured values in relation to predefined parameters for critical situations to find properties and trends in the measured values over time, or a pattern which indicates that an object is not secured properly at an early stage,
    sending information, or an alarm, or both, on the state of the fasteners to one or more external units,
    communicating with one or more external units for communicating the state of and receipt of control information, or both, and
    warning about burglary or loss of secured objects.

34. The sensor unit according to claim 1, wherein the fasteners are load securing fasteners selected from the group consisting of lashings, straps, ropes, wires, and chains.

35. The sensor unit according to claim 16, wherein the fasteners are load securing fasteners selected from the group consisting of lashings, straps, ropes, wires, and chains.

36. The method according to claim 31, wherein the fasteners are load securing fasteners selected from the group consisting of lashings, straps, ropes, wires, and chains.

37. In combination, a sensor unit and a load securing fastener, comprising:
    a fastener for fastening, securing, and anchoring one or more objects, wherein said fastener comprises a bolt;
    wherein the sensor unit remotely monitors the state of the fastener;
    said sensor unit comprising:
    at least one deformable sleeve, to which deformable sleeve at least one measuring element is arranged, which deformable sleeve has a mainly circular shape in default state, wherein the deformable sleeve is arranged for surrounding the bolt or for arrangement in a loop formed at the end of flexible fasteners surrounding the bolt, such that the sleeve is not responsible for transmission of forces in the fasteners, which deformable sleeve is arranged for being asymmetrically deformed by a combination of axial and radial forces acting between the bolt and fasteners or between parts of the fasteners forming the loop or eye at the end of the fasteners and thereby measuring tensioning force straight after tensioning or static tension or pressure acting axially on the fasteners at a given point in time without affecting the fasteners.

38. The combination according to claim 37, wherein the fasteners are load securing fasteners selected from the group consisting of lashings, straps, ropes, wires, and chains.

* * * * *